United States Patent
Lovitt

(10) Patent No.: US 10,192,555 B2
(45) Date of Patent: Jan. 29, 2019

(54) DYNAMIC SPEECH RECOGNITION DATA EVALUATION

(71) Applicant: Microsoft Technology Licensing, LLC, Redmond, WA (US)

(72) Inventor: Andrew William Lovitt, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 31 days.

(21) Appl. No.: 15/140,704

(22) Filed: Apr. 28, 2016

(65) Prior Publication Data

US 2017/0316780 A1   Nov. 2, 2017

(51) Int. Cl.
| | | |
|---|---|---|
| G10L 15/00 | (2013.01) | |
| G10L 15/30 | (2013.01) | |
| G10L 15/01 | (2013.01) | |
| G10L 15/32 | (2013.01) | |
| G10L 15/16 | (2006.01) | |
| G10L 15/02 | (2006.01) | |

(52) U.S. Cl.
CPC .............. *G10L 15/30* (2013.01); *G10L 15/01* (2013.01); *G10L 15/32* (2013.01); *G10L 15/16* (2013.01); *G10L 2015/025* (2013.01)

(58) Field of Classification Search
CPC ..... G10L 15/08; G10L 15/10; G10L 15/1815; G10L 15/1822; G10L 15/22; G10L 25/03; G06F 17/2715
USPC .................................. 704/231, 235, 246, 270
See application file for complete search history.

(56) References Cited

U.S. PATENT DOCUMENTS

| | | | | |
|---|---|---|---|---|
| 6,078,886 A | * | 6/2000 | Dragosh ................. | G10L 15/30 704/243 |
| 6,192,337 B1 | * | 2/2001 | Ittycheriah ............ | G10L 15/063 704/231 |
| 6,487,534 B1 | | 11/2002 | Thelen et al. | |
| 6,529,866 B1 | * | 3/2003 | Cope ................... | G10L 21/0208 381/94.3 |
| 6,594,628 B1 | * | 7/2003 | Jacobs .................... | G10L 15/02 704/231 |

(Continued)

OTHER PUBLICATIONS

"International Search Report and Written Opinion Issued in PCT Application No. PCT/US2017/028229", dated Jul. 21, 2017, 12 Pages. (MS# 359422-WO-PCT).

(Continued)

*Primary Examiner* — Olujimi Adesanya
(74) *Attorney, Agent, or Firm* — Alleman Hall Creasman & Tuttle LLP

(57) ABSTRACT

Computing devices and methods for providing speech recognition data from one computing device to another device are disclosed. In one disclosed embodiment, audio input is received at a client device and processed to generate speech recognition data. An estimated confidence level is determined for a portion of the data, where the confidence level exceeds a predetermined confidence threshold corresponding to a valid result. At least one statistically improbable characteristic associated with the portion of data is identified. Based on identifying the statistically improbable characteristic, the portion of data is provided to a server computing device for evaluation.

16 Claims, 5 Drawing Sheets

(56) References Cited

U.S. PATENT DOCUMENTS

| | | | |
|---|---|---|---|
| 6,757,652 B1* | 6/2004 | Lund | G10L 15/32 704/252 |
| 7,212,968 B1* | 5/2007 | Garner | G06F 17/3043 704/231 |
| 7,292,982 B1* | 11/2007 | Hakkani-Tur | G10L 15/1822 704/10 |
| 7,548,977 B2 | 6/2009 | Agapi et al. | |
| 7,630,900 B1* | 12/2009 | Strom | 704/270 |
| 8,868,409 B1 | 10/2014 | Mengibar et al. | |
| 9,053,708 B2 | 6/2015 | Koch et al. | |
| 9,070,367 B1 | 6/2015 | Hoffmeister et al. | |
| 9,183,843 B2 | 11/2015 | Fanty et al. | |
| 9,190,057 B2 | 11/2015 | Hoffmeister et al. | |
| 9,514,747 B1* | 12/2016 | Bisani | G10L 15/08 |
| 9,798,818 B2* | 10/2017 | Ho | G06F 17/30401 |
| 2002/0143529 A1* | 10/2002 | Schmid | G10L 15/193 704/231 |
| 2005/0055210 A1* | 3/2005 | Venkataraman | G10L 15/065 704/255 |
| 2007/0043561 A1 | 2/2007 | Helbing | |
| 2008/0126100 A1* | 5/2008 | Grost | G10L 15/08 704/275 |
| 2008/0201147 A1* | 8/2008 | Han | G10L 15/30 704/254 |
| 2009/0182559 A1* | 7/2009 | Gerl | G10L 15/08 704/235 |
| 2009/0234651 A1* | 9/2009 | Basir | G10L 15/02 704/254 |
| 2011/0153326 A1 | 6/2011 | Garudadri et al. | |
| 2012/0179457 A1 | 7/2012 | Newman et al. | |
| 2012/0215528 A1* | 8/2012 | Nagatomo | G10L 15/30 704/211 |
| 2013/0030804 A1* | 1/2013 | Zavaliagkos | G10L 15/26 704/235 |
| 2013/0132084 A1* | 5/2013 | Stonehocker | G10L 15/30 704/244 |
| 2013/0151250 A1* | 6/2013 | VanBlon | G10L 15/32 704/235 |
| 2014/0088967 A1* | 3/2014 | Kawamura | G10L 15/30 704/251 |
| 2014/0365200 A1* | 12/2014 | Sagie | G06F 17/289 704/2 |
| 2015/0066496 A1* | 3/2015 | Deoras | G10L 15/16 704/232 |
| 2015/0120290 A1* | 4/2015 | Shagalov | G10L 15/30 704/231 |
| 2015/0127346 A1* | 5/2015 | Gruenstein | G10L 15/08 704/254 |
| 2015/0332673 A1 | 11/2015 | Li et al. | |

OTHER PUBLICATIONS

Chang, et al., "Developing Collaborative Applications with Mobile Cloud—A Case Study of Speech Recognition", In Journal of Internet Services and Information Security, vol. 1, Issue 1, May 2011, pp. 18-36.

Kosta, et al., "ThinkAir: Dynamic Resource Allocation and Parallel Execution in Cloud for Mobile Code Offloading", In Proceedings of IEEE Infocom, Mar. 25, 2012, pp. 1-9.

Gao, et al., "On Exploiting Dynamic Execution Patterns for Workload Offloading in Mobile Cloud Applications", In Proceedings of the IEEE 22nd International Conference on Network Protocols, Oct. 21, 2014, 12 pages.

Assuncao, et al., "Context-aware Job Scheduling for Cloud Computing Environments", In Proceedings of the IEEE/ACM Fifth International Conference on Utility and Cloud Computing, Nov. 5, 2012, pp. 255-262.

Shiraz, et al., "Investigation on Runtime Partitioning of Elastic Mobile Applications for Mobile Cloud Computing", In Journal of Supercomputing archive vol. 67 Issue 1, Aug. 2, 2013, pp. 84-103.

Fernando, et al., "Dynamic Mobile Cloud Computing: Ad Hoc and Opportunistic Job Sharing", In Fourth IEEE International Conference on Utility and Cloud Computing, Dec. 5, 2011, pp. 281-286.

Moazzami, et al., "ORBIT: A Smartphone-Based Platform for Data-Intensive Embedded Sensing Applications", In Proceedings of the 14th International Conference on Information Processing in Sensor Networks, Apr. 14, 2015, 12 pages.

Mousicou, et al., "Performance Evaluation of Dynamic Cloud Resource Migration Based on Temporal and Capacity-Aware Policy for Efficent Resource Sharing", In Proceedings of the 2nd ACM workshop on High performance mobile opportunistic systems, Nov. 3, 2013, pp. 59-66.

* cited by examiner

DYNAMIC SPEECH RECOGNITION DATA EVALUATION

BACKGROUND

Speech recognition programs may operate on devices having various capabilities. A client device may offload speech recognition tasks to another device having more robust capabilities by transferring speech recognition data to the other device. Determining which tasks to offload and when to offload tasks can involve balancing computing resource and availability factors with recognition accuracy, user experience, and other considerations.

SUMMARY

Various embodiments are disclosed herein that relate to speech recognition data evaluation. For example, one disclosed embodiment provides a method for dynamically providing speech recognition data from a client computing device to a server computing device. Audio input may be received at the client computing device and processed to generate speech recognition data. An estimated confidence level may be determined for a portion of the speech recognition data, where the confidence level exceeds a predetermined confidence threshold that corresponds to a valid result. At least one statistically improbable characteristic associated with the portion of the speech recognition data having the estimated confidence level may be identified. Based on identifying the at least one statistically improbable characteristic, the portion of the speech recognition data may be provided to the server computing device for an evaluation of the portion of the speech recognition data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Computing devices may include speech recognition functionality that enables users to interact with a device via spoken commands. For example, a user of a smartphone with speech recognition functionality may control a music player application, interact with a personal assistant application, dictate a text message, initiate a phone call, and perform other actions by speaking commands to the smartphone.

Some computing devices may be communicatively coupled with one or more other computing devices that also include speech recognition functionality, which functionality may be cooperative with other computing devices or may be isolated to a single device. In some examples, it may be desirable to share speech recognition tasks between two or more computing devices. For example, a wearable computing device may include relatively modest speech recognition capabilities and other processing resources of a smaller scale. The wearable device may be communicatively coupled with another computing device, such as a server, that that includes more powerful computing resources and more robust speech recognition capabilities. In some use case scenarios, the wearable computing device may send collected speech recognition data to the server for processing.

A variety of factors may be considered in determining what portion(s) of collected data to send to the server, and which speech recognition task(s) to perform at the client and which tasks to perform at the server. Such factors may include network bandwidth considerations, computing resource availability on both client and server devices, a desired degree of recognition accuracy, particular use case characteristics, user experience considerations, etc.

In some examples a client device may communicate with one or more local and/or remote computing devices via a network. For example, a client device may communicate with one or more cloud-based services on remote computing device(s) via a network. In one example, the user of a client device may interact with an intelligent personal assistant program located on a remote server via voice commands captured by the client device. In these as well as other use cases, prompt processing of the voice commands is desirable to avoid excess latency and provide a pleasing user experience.

Figure 1:
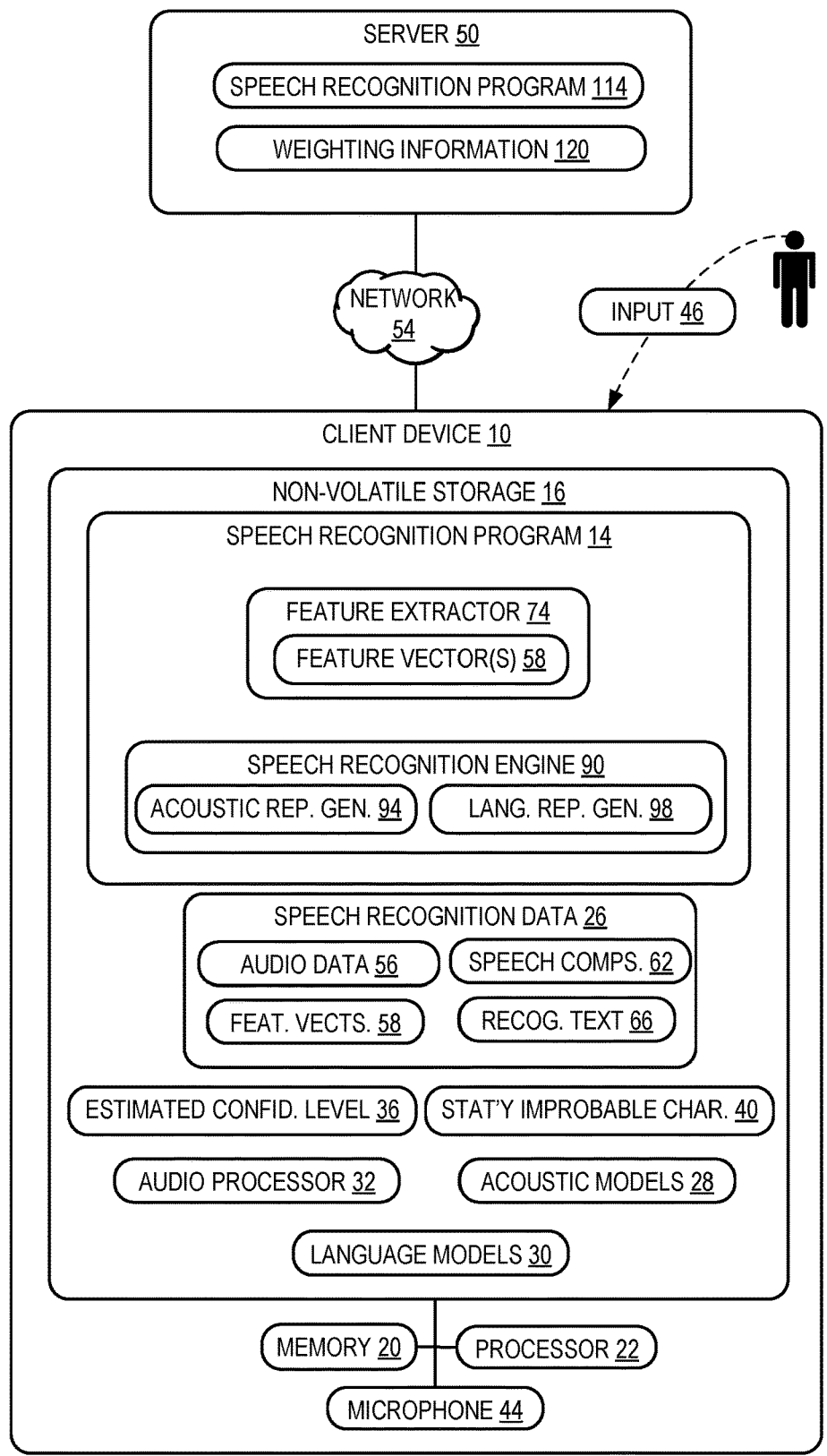
FIG. 1 is a schematic view of a client computing device and a server computing device comprising speech recognition programs according to examples of the present disclosure.

FIG. 1 shows a schematic view of one embodiment of a client computing device 10 that includes a speech recognition program 14. The speech recognition program 14 may be stored in non-volatile storage 16 of the client computing device 10. The speech recognition program 14 may be loaded into memory 20 and executed by a processor 22 of the client computing device 10 to perform one or more of the methods and processes described in more detail below. The non-volatile storage 16 may include speech recognition data 26 generated or received by the speech recognition program 14. As described in more detail below, non-volatile storage 16 also may store acoustic models 28, language models 30, an audio processor 32, estimated confidence levels 36, and statistically improbable characteristics 40 identified by the speech recognition program 14. In some examples, speech recognition program 14 may cooperate with one or more other speech recognition programs to perform one or more of the methods and processes described in more detail below.

As shown in the example of FIG. 1, the client computing device 10 may include or be communicatively coupled with one or more audio input devices, such as microphone 44. In different examples, microphone 44 may be integrated into client computing device 10 or may be located remotely from the client computing device and may communicate with the device via wired or wireless communication. Audio input 46 from a user may be captured by the microphone 44 and provided to the audio processor 32 for processing into audio data.

Figure 2:
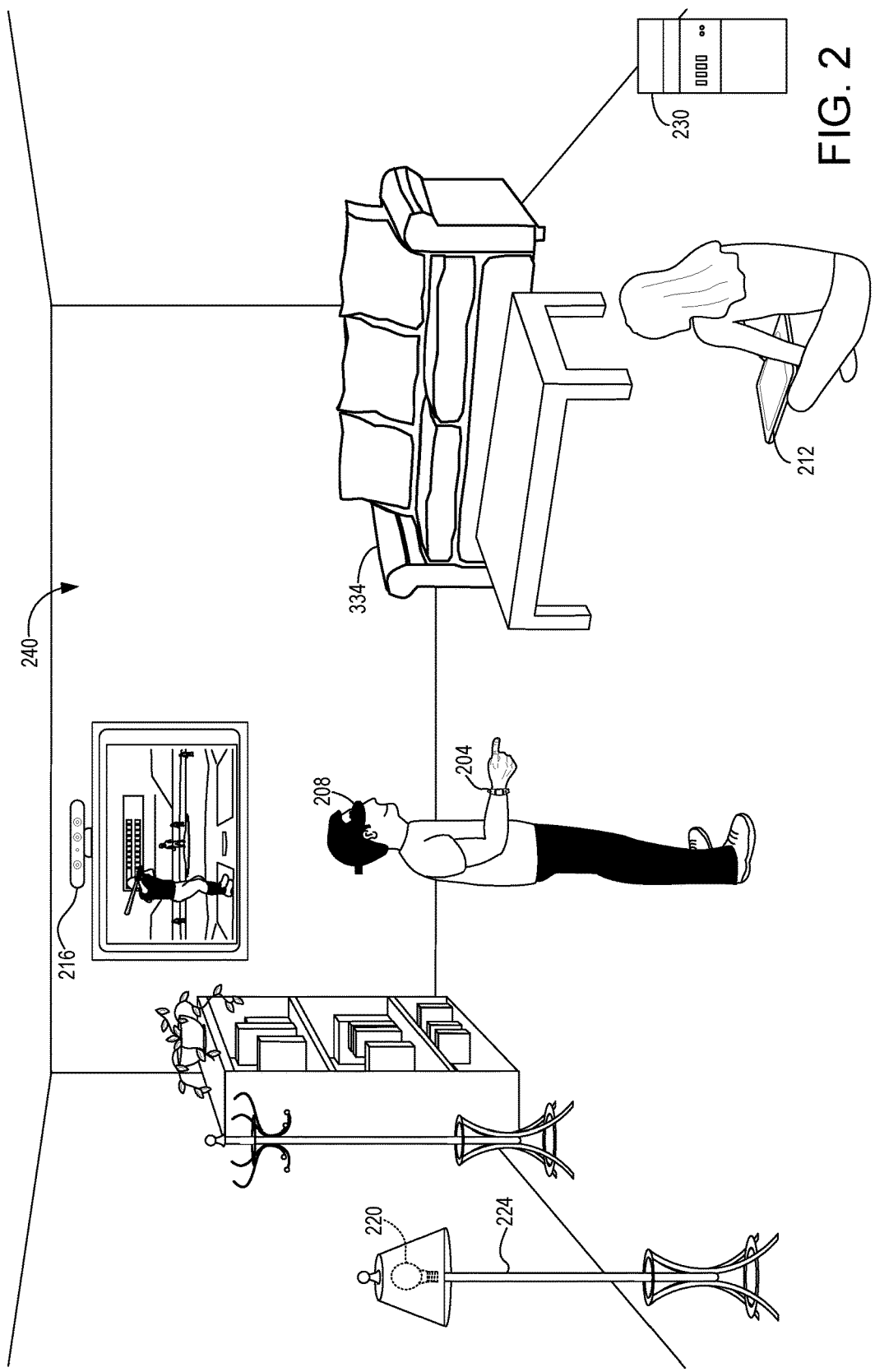
FIG. 2 is a schematic view of a room showing different computing devices comprising speech recognition programs according to examples of the present disclosure.

In different examples the client computing device 10 may take a variety of forms. With reference now to FIG. 2, in some examples the client computing device 10 may take the form of a wearable computing device, such as a wrist-worn band 204 or head-mounted display device 208. In other examples the client computing device 10 may take the form of a mobile computing device, such as a tablet computer 212, smart phone, laptop, or notebook computer. In other examples the client computing device 10 may take the form of a set-top device 216, desktop computing device, gaming console, stand-alone display, or any other suitable type of computing device. In some examples, client computing device 10 may be embedded or otherwise included with other devices, components, vehicles, buildings, or other objects to enable the collection and exchange of data among devices. For example, client computing device 10 may be embedded in a lightbulb 220 in the lamp 224, which lightbulb may be communicatively coupled with a local server computing device 230 in the room 240.

In some examples, the client computing device 10 may be operatively connected with one or more other computing devices using a wired connection, or may employ a wireless connection via WiFi, Bluetooth, or any other suitable wireless communication protocol. As shown in FIG. 1, such other computing devices may include a server computing device 50. For example, the client computing device 10 and server computing device 50 may be communicatively coupled via a network 54. The network 54 may take the form of a local area network (LAN), wide area network (WAN), wired network, wireless network, personal area network, or a combination thereof, and may include the Internet. In other examples and with reference to FIG. 2, such other computing devices may include local devices, such as server computing device 230. Additional details regarding the components and computing aspects of the client computing device 10 and server computing devices 50 and 230 are described in more detail below with reference to FIG. 4.

With reference again to FIG. 1 and as described in more detail below, in some examples the speech recognition program 14 may determine an estimated confidence level 36 for a portion of the speech recognition data 26 having a selected type of one or more types. In some examples, the types of speech recognition data 26 may include audio data 56, feature vectors 58 generated by a feature extractor 74, speech components 62 and recognized text 66. In some examples audio data 56 may include raw audio data and/or processed audio, such as audio with echoes or noise removed.

As described in example use cases below, the estimated confidence level 36 may exceed a predetermined confidence threshold that corresponds to a valid result. The speech recognition program may then identify at least one statistically improbable characteristic 40 associated with this portion of the speech recognition data 26 having the estimated confidence level exceeding the predetermined confidence threshold. Based on identifying the statistically improbable characteristic 40, the speech recognition program 14 may provide the portion of the speech recognition data to the server computing device 50 for an evaluation of the portion of the speech recognition data.

Descriptions of example use cases of dynamically providing speech recognition data from a client computing device to a server computing device will now be provided. As noted above, speech recognition program 14 may be configured to process spoken audio input 46 into recognized text 66. Client computing device 10 may use the recognized text 66 for various purposes, such as inputting data, executing commands, controlling device functionality, communicating with server computing device 50, etc.

Audio input 46 may be captured by microphone 44 and processed by audio processor 32 to create audio data. In some examples, audio processor 32 may comprise one or more signal conditioning filters. For example, audio processor 32 may comprise an acoustic echo suppression filter that may condition the audio signal to suppress or cancel echoes in the signal. The audio processor 32 may dynamically adjust the filter parameters to correspond to changing acoustic characteristics of the room or other environment.

Audio data from the audio processor 32 may be transformed by the feature extractor 74 into data for processing by a speech recognition engine 90 of the speech recognition program 14. In some examples, feature extractor 74 may identify portions of the audio data over a time interval that contain speech for processing. Feature extractor 74 may extract feature vectors 58 from such portions of the data, with a feature vector representing the qualities of a spoken utterance within the time interval of a given portion. A matrix of multiple feature vectors 58 may be provided to the speech recognition engine 90 for further processing.

Feature extractor 74 may utilize any suitable dimensionality reduction techniques to process the audio data and generate feature vectors 58. Example techniques include using mel-frequency cepstral coefficients (MFCCs), linear discriminant analysis, deep neural network techniques, etc.

The speech recognition engine 90 may compare the feature vectors 58 generated by feature extractor 74 with acoustic models 28 for speech sounds (e.g., speech components 62). Examples of speech components 62 may include phonemes, phones, diphones, triphones, etc. In some examples, the speech recognition engine 90 may comprise an acoustic representation generator 94 (e.g., acoustic modeler) that evaluates the similarity of a spoken utterance represented by one or more feature vectors 58 to acoustic models 28 of language sounds. The acoustic models 28 may comprise data that matches pronunciations of speech components, such as phonemes, to particular words and/or phrases.

The speech recognition engine 90 also may compare the feature vectors and other audio data with sequences of sounds to identify words and/or phrases that match the spoken sounds of the audio data. Such sequences may be stored in language models 30 comprising data describing words and/or phrases that are likely to be used together in certain contexts. The speech recognition program 14 of FIG. 1 comprises a language representation generator 98 (e.g., language modeler) that may utilize the language models 30 to evaluate the likelihood that a particular word would be included in a sentence at a particular location.

In some examples, the speech recognition engine 90 may utilize Hidden Markov models (HMMs) to match feature vectors 58 with phonemes and/or other speech components 62. An HMM outputs sequences of n-dimensional vectors, where n is an integer such as 10. Sequences may be generated at a given frequency, such as one sequence every 10 milliseconds.

Each state of an HMM may comprise a statistical distribution that is a mixture of diagonal covariance Gaussians, which may indicate a likelihood for each observed vector. Each phoneme or word may have a different output distribution. Individual HMMs for separate phonemes and words may be combined to create an HMM for a sequence of phonemes or words.

Context dependency for phonemes may be provided by different states of an HMM. Such context-dependent HMM states may be associated with a model, such as a Gaussian mixture model (GMM). In some examples, transitions between states may be assigned probabilities that correspond to a likelihood that a current state may be reached from a previous state. Different paths between states of the HMM may represent inputted sounds, with the different paths representing multiple possible text matches for the same sound.

Using the feature extractor 74 and speech recognition engine 90, the speech recognition program 14 may process feature vectors 58 and other speech recognition data 26 to generate recognized text 66. In other examples, any suitable techniques for matching feature vectors 58 to phonemes and/or other speech components 62 may be utilized.

As described in more detail below with respect to example use cases, in some examples the speech recognition program 14 may determine an estimated confidence level 36 for one or more types of the speech recognition data 26. The estimated confidence level 36 may be compared to a predetermined confidence threshold that corresponds to a valid result for the particular type of data being analyzed. In some examples the predetermined confidence threshold may be a fixed value that has been selected or determined through empirical analysis or machine learning techniques to represent a magnitude above which a result is likely to be valid.

In some examples where the estimated confidence level exceeds the predetermined confidence threshold, the client computing device 10 may continue to utilize the corresponding portion of speech recognition data 26 in the speech recognition process. In one example, output neurons from the acoustic representation generator 94 representing speech components 62 of a word, such as phonemes, diphones, etc., may have different estimated confidence levels. For example, the acoustic representation generator 94 may identify a portion of the word as the phoneme /P/ with an estimated confidence level of 92 on a scale of 0-100. Where the predetermined confidence threshold is 85 on this scale, the speech recognition program 14 may continue processing the speech recognition data with this portion identified as the phoneme /P/.

In some examples and despite a high estimated confidence level for a portion of speech recognition data 26, the speech recognition program 14 may be incorrectly analyzing such portion. To address such situations, the speech recognition program may identify at least one statistically improbable characteristic 40 associated with this portion of the speech recognition data 26. Upon identifying such a statistically improbable characteristic 40, the speech recognition program may provide the portion of the speech recognition data to the server computing device 50 for an evaluation of this portion of the speech recognition data.

In this manner, speech recognition results that are associated with high confidence values, but also include one or more inaccuracies or errors, may be further analyzed and/or reevaluated using additional resources of the server computing device 50. For example, the server computing device 50 may comprise a speech recognition program 114 having different and/or greater capabilities as compared to the speech recognition program 14 of the client computing device 10. For example, the speech recognition program 114 may utilize a larger collection of acoustic models, the server computing device 50 may have access to greater computational resources, etc. In these situations, such further analysis and/or reevaluation by server computing device 50 may identify inaccuracies or errors in the portion of speech recognition data provided by the client device. Accordingly, the server computing device 50 may provide corrections and/or other useful feedback to the client device.

Continuing with the example above, the portion of speech recognition data identified as phoneme /P/ may have the estimated confidence level of 92 on the scale of 0-100. Other possible phonemes evaluated for this portion of data may have returned low estimated confidence levels of, for example, 0-5. However, the phoneme /M/ may have returned an estimated confidence level of 50. Analyzing these results, the speech recognition program 14 may identify that the occurrence of this particular group of confidence levels (/P/=92, /M/=50, all others=0-5) for this portion of data is statistically improbable. In other words, the phonemes /P/ and /M/ are rarely confused with one another, and thus this portion of data has one or more unusual qualities that may call into question its accuracy. Accordingly and based on identifying this statistically improbable characteristic, the speech recognition program 14 may provide this portion of the speech recognition data to the server computing device 50 for supplemental evaluation. The results of the server's evaluation may be provided to the client computing device 10 and utilized in evaluating this portion of data.

In some examples, the speech recognition program 14 may identify at least one statistically improbable characteristic 40 associated with a portion of the speech recognition data 26 using one or more machine learning techniques. For example, the speech recognition program 14 may utilize one or more probabilistic models to analyze portions of the speech recognition data 26, one or more results extracted from the speech recognition analysis pipeline, and/or estimated confidence levels associated with such portions. For example, GMMs may be utilized to analyze portions of the speech recognition data 26 and corresponding results. Those results that fall between Gaussian mixtures may be identified as statistically improbable, and may be provided to the server computing device 50 for further analysis. It will be appreciated that any other suitable machine learning techniques, such as various supervised learning and unsupervised learning approaches, may be utilized to identify statistically improbable characteristics associated with speech recognition data 26.

As noted above, in some examples one or more speech components 62 may be provided to server computing device 50 for further evaluation. In some examples, to determine whether to provide one or more speech components 62 to the server computing device 50, the speech recognition program 14 may compare the acoustic representation generator 94 of the speech recognition program 14 with an acoustic representation generator utilized by the speech recognition program 114 of the server computing device 50. Based on determining that the speech recognition program 14 of client computing device 10 comprises acoustic representation generator 94 for analyzing speech components 62, and that the speech recognition program 114 of server computing device 60 comprises a different acoustic representation generator, the client computing device 10 may provide speech components 62 to the server computing device 50 for processing by its different acoustic representation generator.

For example, the acoustic representation generator utilized by speech recognition program 114 may have access to a larger collection of acoustic models to evaluate and/or provide a more robust modeling process to the speech components 62. In this manner, the speech recognition program 14 of client computing device 10 may utilize this additional information indicating that server computing device 50 has more powerful capabilities as compared to client computing device 10 in its determination to send speech components 62 to the server computing device.

In some examples, a feature vector 58 generated by feature extractor 74 may have an estimated confidence level 36 that exceeds a predetermined confidence threshold. By applying a machine learning technique as discussed above, a statistically improbable characteristic 40 associated with the feature vector also may be identified. For example, the feature vector may be determined to include a particular grouping of numerical features that is highly unusual. Upon identifying such a statistically improbable characteristic, the speech recognition program 14 may provide the feature vector 58 to the server computing device 50 for further evaluation.

In some examples, to determine whether to provide the feature vector 58 to the server computing device 50 for further evaluation, the speech recognition program 14 may compare the feature extractor 74 of the speech recognition program 14 with one or more feature extractor(s) utilized by the speech recognition program 114 of the server computing device 50. Based on determining that the speech recognition program 14 of client computing device 10 comprises a feature extractor 74 that generates the feature vector 58, and that the speech recognition program 114 of server computing device 60 comprises a different feature extractor, the client computing device 10 may provide the feature vector 58 to the server computing device 50 for processing by its different feature extractor. For example, the feature extractor utilized by speech recognition program 114 may apply more robust dimensionality reduction techniques to evaluate and/or refine the accuracy of the feature vector 58 generated by feature extractor 74.

In some examples, the speech recognition program 14 of client computing device 10 may provide state information of the acoustic representation generator 94 to the server computing device 50 along with portions of the speech recognition data 26. For example, where the speech recognition engine 90 provides feature vectors 58 to the server computing device 50 for analysis, providing corresponding state information of the acoustic representation generator 94 may provide context of the feature vectors that may be used by the acoustic representation generator of the server computing device.

In one example, a feature vector 58 may correspond to a section of audio data 56 having a length of 10 milliseconds. To assist the acoustic representation generator of the server computing device 50 to analyze this feature vector, state information comprising feature vector data corresponding to a preceding time frame just before the section of audio data 56, and corresponding to a following time frame just after the section of data, also may be provided to the server. In this manner, the acoustic representation generator of the speech recognition program 114 of server computing device 50 may utilize this state information in reevaluating the feature vector 58.

In other examples, other types and forms of state information may be provided to server computing device 50. Such examples may include various information related to a component of the speech recognition program 14, such as historical buffer information and any other type of program state information.

In some examples where the server computing device 50 evaluates one or more portions of speech recognition data 26 provided by the client computing device 10, the server computing device 50 may utilize such evaluations to provide feedback to the client computing device 10. The client computing device 10 may utilize such feedback to modify one or more aspects of its speech recognition program 14 and/or other related components.

In some examples, the server computing device 50 may utilize its evaluations of speech recognition data 26 to derive weighting information 120 that the client computing device 10 may utilize to bias one or more aspects of its speech recognition program 14. In one example, the client computing device 10 may send to the server computing device 50 portions of the speech recognition data 26 comprising recognized text 66 in the form of a person's name, such as "Onofre." In this example the speech recognition program 14 may have identified a statistically improbable characteristic 40 associated with this recognized text 66.

The speech recognition program 114 of server computing device 50 may evaluate this recognized text 66 and confirm its accuracy. Based on this evaluation and confirmation, the speech recognition program 114 may then derive weighting information 120 that biases the speech recognition engine 90 of client computing device 10 to accept such recognized text in future analyses. For example, such weighting information 120 may bias the language representation generator 98 of speech recognition engine 90 to authenticate text output that corresponds to the name "Onofre." The client computing device 10 may receive such weighting information 120 from the server computing device 10, and may utilize such information to bias its language representation generator 98 accordingly.

Accordingly and with the language representation generator 98 biased in this manner, where the speech recognition program 14 subsequently outputs the name "Onofre" in recognized text 66, the client computing device 10 may forego sending this text to the server computing device 50 for evaluation, and instead may accept the validity of this result. In this manner, network bandwidth may be saved and additional latency arising from obtaining reevaluation from the server computing device 50 may be avoided.

In some examples, the speech recognition program 14 of client computing device 10 may provide audio data 56, such as one or more portions of an audio file generated from the spoken input 46, to the server computing device 50. For example, though audio data 56 may have an estimated confidence level above a predetermined confidence threshold, the speech recognition program 14 may identify a statistically improbable characteristic 40 of the audio data 56. Accordingly and based on this statistically improbable characteristic, the speech recognition program 14 may provide this portion(s) of the audio data 56 to the server computing device 50 for evaluation. In some examples the server computing device 50 may evaluate the audio data 56 and confirm the integrity of the data, identify one or more suspect portions of the data, and/or provide modifications to the data to the client computing device 10.

Figure 3A:
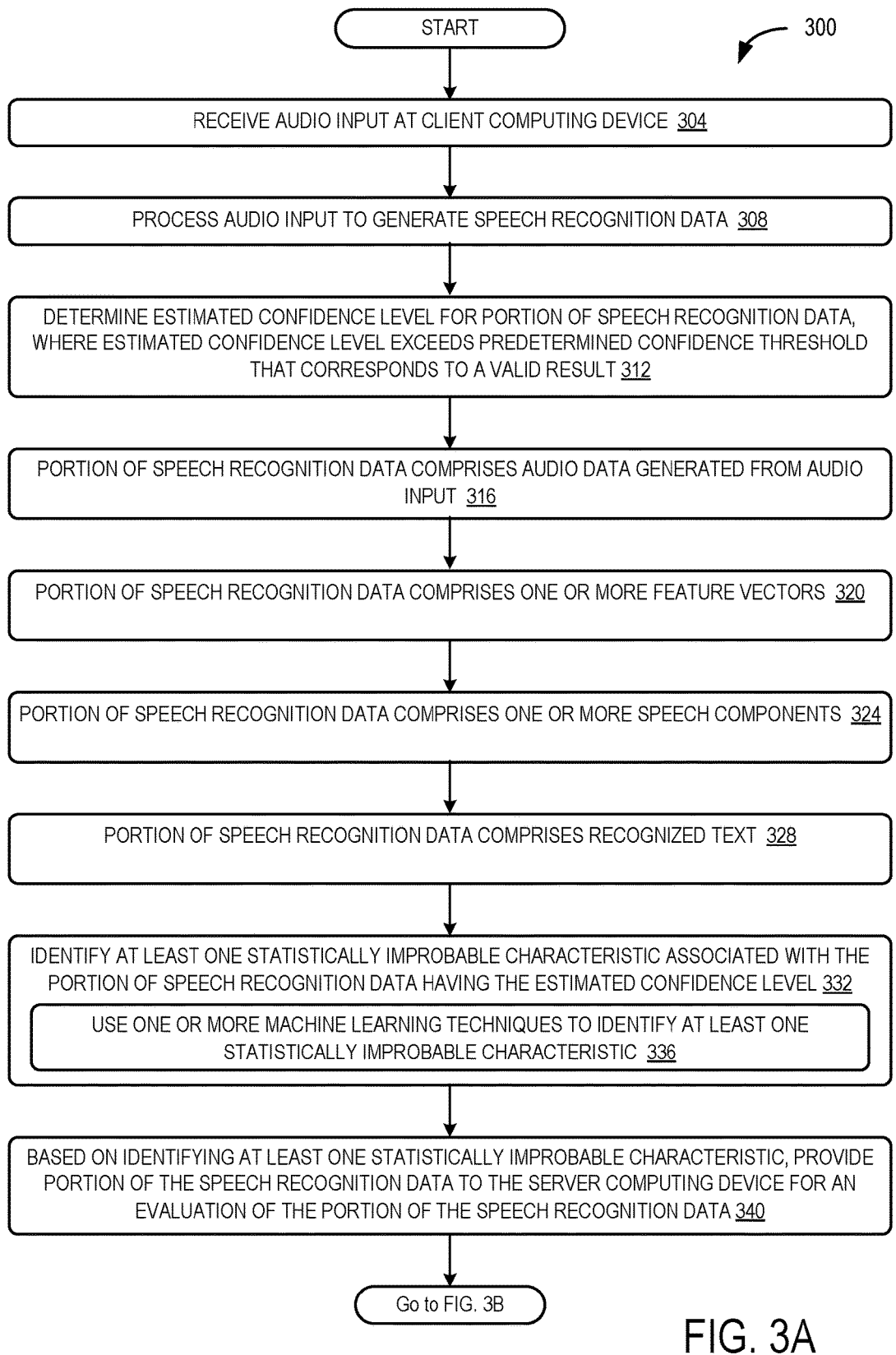
FIGS. 3A and 3B are a flow chart of a method for dynamically providing speech recognition data from a client computing device to a server computing device according to an example of the present disclosure.
Figure 3B:
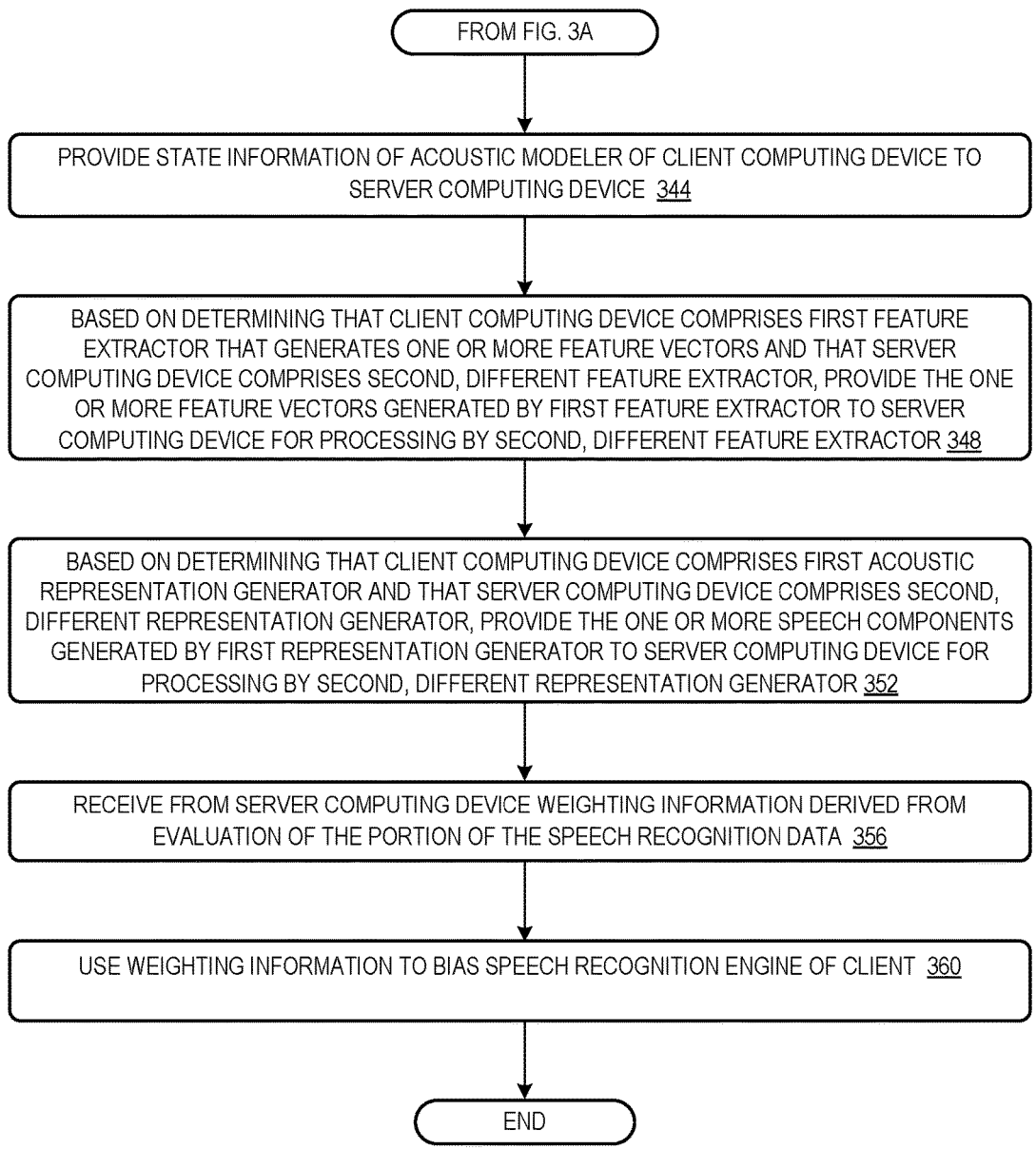

FIGS. 3A and 3B illustrate a flow chart of a method 300 for dynamically providing speech recognition data from a client computing device to a server computing device according to an example of the present disclosure. The following description of method 300 is provided with reference to the software and hardware components described above and shown in FIGS. 1-2. It will be appreciated that method 300 also may be performed in other contexts using other suitable hardware and software components.

With reference to FIG. 3A, at 304 the method 300 may include receiving audio input at the client computing device. At 308 the method 300 may include processing the audio input to generate the speech recognition data. At 312 the method 300 may include determining an estimated confidence level for a portion of the speech recognition data, wherein the estimated confidence level exceeds a predetermined confidence threshold that corresponds to a valid result.

At 316 the portion of speech recognition data may comprise audio data generated from the audio input. At 320 the portion of speech recognition data may comprise one or more feature vectors. At 324 the portion of speech recognition data may comprise one or more speech components. At 328 the portion of speech recognition data may comprise recognized text.

At 332 the method 300 may include identifying at least one statistically improbable characteristic associated with the portion of the speech recognition data having the estimated confidence level. At 336 the method 300 may include using one or more machine learning techniques to identify the at least one statistically improbable characteristic. At 340 the method 300 may include, based on identifying the at least one statistically improbable characteristic, providing the portion of the speech recognition data to a server computing device for an evaluation of the portion of the speech recognition data.

With reference now to FIG. 3B, at 344 the method 300 may include, wherein the client computing device comprises an acoustic representation generator that processes the one or more feature vectors, providing state information of the acoustic representation generator to the server computing device. At 348 the method 300 may include, based on determining that the client computing device comprises a first feature extractor that generates the one or more feature vectors and that the server computing device comprises a second, different feature extractor, providing the one or more feature vectors generated by the first feature extractor to the server computing device for processing by the second, different feature extractor.

At 352 the method 300 may comprise, based on determining that the client computing device comprises a first acoustic representation generator and that the server computing device comprises a second, different acoustic representation generator, providing the one or more speech components generated by the first acoustic representation generator to the server computing device for processing by the second, different acoustic representation generator. At 356 the method 300 may comprise receiving from the server computing device weighting information 120 derived from the evaluation of the portion of the speech recognition data. At 360 the method 300 may comprise using the weighting information 120 to bias a speech recognition engine of the client.

It will be appreciated that method 300 is provided by way of example and is not meant to be limiting. Therefore, it is to be understood that method 300 may include additional and/or alternative steps relative to those illustrated in FIGS. 3A and 3B. Further, it is to be understood that method 300 may be performed in any suitable order. Further still, it is to be understood that one or more steps may be omitted from method 300 without departing from the scope of this disclosure.

In some embodiments, the methods and processes described herein may be tied to a computing system of one or more computing devices. In particular, such methods and processes may be implemented as a computer-application program or service, an application-programming interface (API), a library, and/or other computer-program product.

Figure 4:
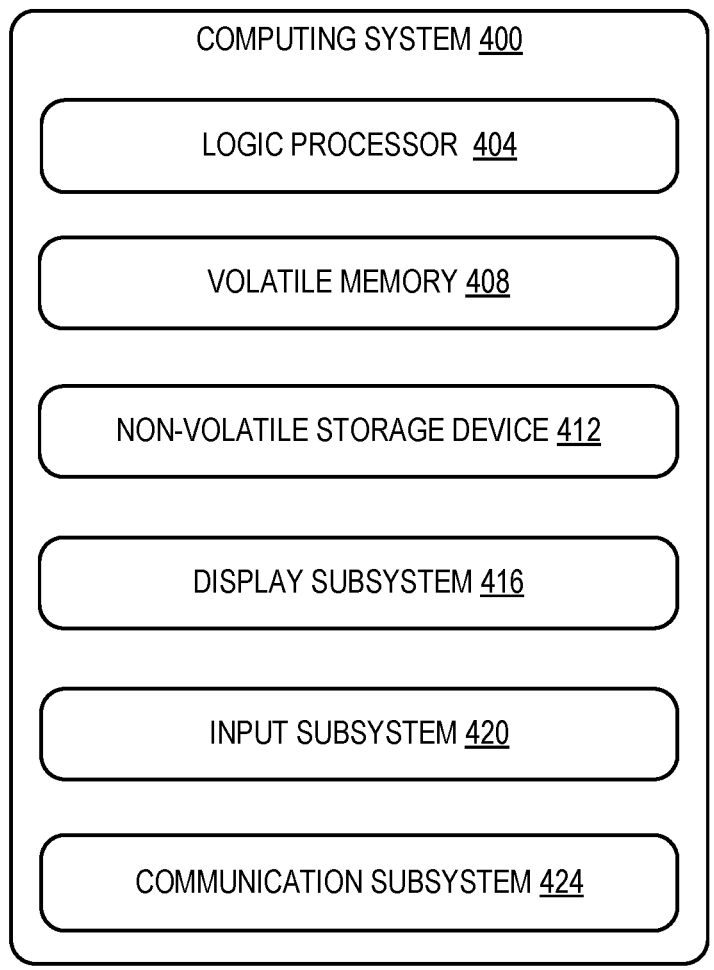
FIG. 4 is a simplified schematic illustration of an embodiment of a computing device.

FIG. 4 schematically shows a non-limiting embodiment of a computing system 400 that can enact one or more of the methods and processes described above. Computing system 400 is shown in simplified form. Client computing device 10, server computing device 50, and server computing device 230 may take the form of computing system 400.

Computing system 400 includes a logic processor 404, volatile memory 408, and a non-volatile storage device 412. Computing system 400 may optionally include a display subsystem 416, input subsystem 420, communication subsystem 424, and/or other components not shown in FIG. 4.

Logic processor 404 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 404 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 404 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 404 may be virtualized and executed by remotely accessible, networked computing devices configured in a cloud-computing configuration. In such a case, these virtualized aspects may be run on different physical logic processors of various different machines.

Volatile memory 408 may include physical devices that include random access memory. Volatile memory 408 is typically utilized by logic processor 404 to temporarily store information during processing of software instructions. It will be appreciated that volatile memory 408 typically does not continue to store instructions when power is cut to the volatile memory.

Non-volatile storage device 412 includes one or more physical devices configured to hold instructions executable by the logic processors to implement the methods and processes described herein. When such methods and processes are implemented, the state of non-volatile storage device 412 may be transformed—e.g., to hold different data.

Non-volatile storage device 412 may include physical devices that are removable and/or built-in. Non-volatile storage device 412 may include optical memory (CD, DVD, HD-DVD, Blu-Ray Disc, etc.), semiconductor memory (ROM, EPROM, EEPROM, FLASH memory, etc.), and/or magnetic memory (hard-disk drive, floppy-disk drive, tape drive, MRAM, etc.), or other mass storage device technology. Non-volatile storage device 412 may include nonvolatile, dynamic, static, read/write, read-only, sequential-access, location-addressable, file-addressable, and/or content-addressable devices. It will be appreciated that non-volatile storage device 412 is configured to hold instructions even when power is cut to the non-volatile storage device.

Aspects of logic processor 404, volatile memory 408, and non-volatile storage device 412 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "engine" may be used to describe an aspect of computing system 400 implemented to perform a particular function. In some cases, a program or engine may be instantiated via logic processor 404 executing instructions held by non-volatile storage device 412, using portions of volatile memory 408. It will be understood that different programs and engines may be instantiated from the same application, service, code block, object, library, routine, API, function, etc. Likewise, the same program or engine may be instantiated by different applications, services, code blocks, objects, routines, APIs, functions, etc. The terms "program" and "engine" encompass individual or groups of executable files, data files, libraries, drivers, scripts, database records, etc.

When included, display subsystem 416 may be used to present a visual representation of data held by non-volatile storage device 412. As the herein described methods and processes change the data held by the non-volatile storage device, and thus transform the state of the non-volatile storage device, the state of display subsystem 416 may likewise be transformed to visually represent changes in the underlying data. Display subsystem 416 may include one or more display devices utilizing virtually any type of technology. Such display devices may be combined with logic processor 404, volatile memory 408, and/or non-volatile storage device 412 in a shared enclosure, or such display devices may be peripheral display devices.

When included, input subsystem 420 may comprise or interface with one or more user-input devices. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition, such as microphone 44; an infrared, color, stereoscopic, and/or depth camera for machine vision and/or gesture recognition; a head tracker, eye tracker, accelerometer, and/or gyroscope for motion detection, gaze detection, and/or intent recognition; electric-field sensing componentry for assessing brain activity; and/or any other suitable sensor.

When included, communication subsystem 424 may be configured to communicatively couple computing system 400 with one or more other computing devices. Communication subsystem 424 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the Internet.

The following paragraphs provide additional support for the claims of the subject application. One aspect provides a method of dynamically providing speech recognition data from a client computing device to a server computing device, the method comprising: receiving audio input at the client computing device; processing the audio input to generate the speech recognition data; determining an estimated confidence level for a portion of the speech recognition data, wherein the estimated confidence level exceeds a predetermined confidence threshold that corresponds to a valid result; identifying at least one statistically improbable characteristic associated with the portion of the speech recognition data having the estimated confidence level; and based on identifying the at least one statistically improbable characteristic, providing the portion of the speech recognition data to the server computing device for an evaluation of the portion of the speech recognition data. The method may additionally or optionally include using one or more machine learning techniques to identify the at least one statistically improbable characteristic. The method may additionally or optionally include, wherein the portion of speech recognition data comprises audio data generated from the audio input. The method may additionally or optionally include, wherein the portion of speech recognition data comprises one or more feature vectors. The method may additionally or optionally include, wherein the client computing device comprises an acoustic representation generator that processes the one or more feature vectors, the method further comprising providing state information of the acoustic representation generator to the server computing device. The method may additionally or optionally include, based on determining that the client computing device comprises a first feature extractor that generates the one or more feature vectors and that the server computing device comprises a second, different feature extractor, providing the one or more feature vectors generated by the first feature extractor to the server computing device for processing by the second, different feature extractor. The method may additionally or optionally include, wherein the portion of speech recognition data comprises one or more speech components. The method may additionally or optionally include, based on determining that the client computing device comprises a first acoustic representation generator and that the server computing device comprises a second, different acoustic representation generator, providing the one or more speech components generated by the first acoustic representation generator to the server computing device for processing by the second, different acoustic representation generator. The method may additionally or optionally include, wherein the portion of speech recognition data comprises recognized text. The method may additionally or optionally include: receiving from the server computing device weighting information derived from the evaluation of the portion of the speech recognition data; and using the weighting information to bias a speech recognition engine of the client.

Another aspect provides a computing device, comprising: a processor; and a speech recognition program comprising instructions stored in a mass storage of the computing device, the speech recognition program executable by the processor to: receive audio input; process the audio input to generate speech recognition data; determine an estimated confidence level for a portion of the speech recognition data, wherein the estimated confidence level exceeds a predetermined confidence threshold that corresponds to a valid result; identify at least one statistically improbable characteristic associated with the portion of the speech recognition data having the estimated confidence level; and based on identifying the at least one statistically improbable characteristic, provide the portion of the speech recognition data to a different computing device for an evaluation of the portion of the speech recognition data. The computing device may additionally or alternatively include, wherein the speech recognition program is configured to use one or more machine learning techniques to identify the at least one statistically improbable characteristic. The computing device may additionally or alternatively include, wherein the portion of speech recognition data comprises audio data generated from the audio input. The computing device may additionally or alternatively include, wherein the portion of speech recognition data comprises one or more feature vectors. The computing device may additionally or alternatively include, wherein the speech recognition program comprises an acoustic representation generator that processes the one or more feature vectors, the speech recognition program configured to provide state information of the acoustic representation generator to the different computing device. The computing device may additionally or alternatively include, wherein the speech recognition program comprises a first feature extractor that generates the one or more feature vectors, the speech recognition program is configured to determine that the different computing device comprises a second, different feature extractor, and the speech recognition program is configured to, based on determining that the different computing device comprises the second, different feature extractor, provide the one or more feature vectors generated by the first feature extractor to the different computing device for processing by the second, different feature extractor. The computing device may additionally or alternatively include, wherein the portion of speech recognition data comprises one or more speech components. The computing device may additionally or alternatively include, wherein the speech recognition program is configured to: receive from the different computing device weighting information derived from the evaluation of the portion of the speech recognition data; and use the weighting information to bias a speech recognition engine of the speech recognition program.

Another aspect provides a computing device, comprising: a processor; and a speech recognition program comprising instructions stored in a mass storage of the computing device, the speech recognition program executable by the processor to: receive audio input; process the audio input to generate speech recognition data, wherein the speech recognition data comprises one or more of audio data, feature vectors, speech components, and recognized text; determine an estimated confidence level for a portion of the speech recognition data, wherein the estimated confidence level exceeds a predetermined confidence threshold that corresponds to a valid result; use one or more machine learning techniques to identify at least one statistically improbable characteristic associated with the portion of the speech recognition data having the estimated confidence level; based on identifying the at least one statistically improbable characteristic, provide the portion of the speech recognition data to a different computing device for an evaluation of the portion of the speech recognition data; receive from the different computing device weighting information derived from the evaluation of the portion of the speech recognition data; and use the weighting information to bias a speech recognition engine of the speech recognition program. The computing device may additionally or alternatively include, wherein the portion of the speech recognition data comprises the feature vectors that are generated by an acoustic representation generator of the speech recognition program, the speech recognition program configured to provide state information of the acoustic representation generator to the different computing device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of dynamically providing speech recognition data from a client computing device to a server computing device, the method comprising:
   receiving audio input at the client computing device;
   processing the audio input to generate the speech recognition data;
   determining a first estimated confidence level for a first identified portion of the speech recognition data comprising a first feature vector, wherein the first estimated confidence level exceeds a predetermined confidence threshold that corresponds to a valid result;
   based on determining that the first estimated confidence level corresponds to the valid result, continuing to process the speech recognition data with the first identified portion;
   determining a second estimated confidence level for a second identified portion of the speech recognition data comprising a second feature vector, wherein the second estimated confidence level also exceeds the predetermined confidence threshold that corresponds to the valid result;
   identifying at least one statistically improbable characteristic associated with the second feature vector;
   determining that the client computing device comprises a first feature extractor;
   comparing the first feature extractor of the client computing device with a second feature extractor utilized by the server computing device;
   based on comparing the first feature extractor of the client computing device with the second feature extractor utilized by the server computing device, determining that the second feature extractor of the server computing device is different from the first feature extractor;
   based on (1) determining the second estimated confidence level corresponds to the valid result, (2) identifying the at least one statistically improbable characteristic, and (3) determining that the server computing device comprises the second feature extractor different from the first feature extractor, providing the second feature vector to the server computing device for an evaluation of the second feature vector by the second, different feature extractor.

2. The method of claim 1, further comprising using one or more machine learning techniques to identify the at least one statistically improbable characteristic.

3. The method of claim 1, wherein the first identified portion and the second identified portion of the speech recognition data comprise audio data generated from the audio input.

4. The method of claim 1, wherein the client computing device comprises an acoustic representation generator that processes the one or more feature vectors, the method further comprising providing state information of the acoustic representation generator to the server computing device.

5. The method of claim 1, wherein the first identified portion and the second identified portion of the speech recognition data comprise one or more speech components.

6. The method of claim 5, further comprising, based on determining that the client computing device comprises a first acoustic representation generator and that the server computing device comprises a second, different acoustic representation generator, providing the one or more speech components generated by the first acoustic representation generator to the server computing device for processing by the second, different acoustic representation generator.

7. The method of claim 1, wherein the first identified portion and the second identified portion of the speech recognition data comprise recognized text.

8. The method of claim 1, further comprising:
receiving from the server computing device weighting information derived from the evaluation of the speech recognition data; and
using the weighting information to bias a speech recognition engine of the client.

9. A computing device, comprising:
a processor;
a mass storage device; and
a speech recognition program stored in the mass storage device, the speech recognition program comprising instructions executable by the processor to:
receive audio input;
process the audio input to generate speech recognition data;
determine a first estimated confidence level for a first identified portion of the speech recognition data comprising a first feature vector, wherein the first estimated confidence level exceeds a predetermined confidence threshold that corresponds to a valid result;
based on determining that the first estimated confidence level corresponds to the valid result, continue to process the speech recognition data with the first identified portion;
determine a second estimated confidence level for a second identified portion of the speech recognition data comprising a second feature vector, wherein the second estimated confidence level also exceeds the predetermined confidence threshold that corresponds to the valid result;
identify at least one statistically improbable characteristic associated with the second feature vector;
determine that the client computing device comprises a first feature extractor;
compare the first feature extractor of the computing device with a second feature extractor utilized by a different computing device;
based on comparing the first feature extractor of the computing device with the second feature extractor utilized by the different computing device, determine that the second feature extractor of the different computing device is different from the first feature extractor;
based on (1) determining the second estimated confidence level corresponds to the valid result, (2) identifying the at least one statistically improbable characteristic, and (3) determining that the different computing device comprises the second feature extractor different from the first feature extractor, provide the second feature vector to the different computing device for an evaluation of the second feature vector by the second, different feature extractor.

10. The computing device of claim 9, wherein the speech recognition program is configured to use one or more machine learning techniques to identify the at least one statistically improbable characteristic.

11. The computing device of claim 9, wherein the first identified portion and the second identified portion of the speech recognition data comprise audio data generated from the audio input.

12. The computing device of claim 9, wherein the speech recognition program comprises an acoustic representation generator that processes the first feature vector and the second feature vector, the speech recognition program configured to provide state information of the acoustic representation generator to the different computing device.

13. The computing device of claim 9, wherein the first identified portion and the second identified portion of the speech recognition data comprise one or more speech components.

14. The computing device of claim 9, wherein the speech recognition program is configured to:
receive from the different computing device weighting information derived from the evaluation of the speech recognition data; and
use the weighting information to bias a speech recognition engine of the speech recognition program.

15. A computing device, comprising:
a processor;
a mass storage device; and
a speech recognition program stored in the mass storage device, the speech recognition program comprising instructions executable by the processor to:
receive audio input;
process the audio input to generate speech recognition data, wherein the speech recognition data comprises one or more of audio data, feature vectors, speech components, and recognized text;
determine a first estimated confidence level for a first identified portion of the speech recognition data comprising a first feature vector, wherein the first estimated confidence level exceeds a predetermined confidence threshold that corresponds to a valid result;
based on determining that the first estimated confidence level corresponds to the valid result, continue to process the speech recognition data with the first identified portion;
determine a second estimated confidence level for a second identified portion of the speech recognition data comprising a second feature vector, wherein the second estimated confidence level also exceeds the predetermined confidence threshold that corresponds to the valid result;
use one or more machine learning techniques to identify at least one statistically improbable characteristic associated with the second feature vector
determine that the computing device comprises a first feature extractor;
compare the first feature extractor of the computing device with a second feature extractor utilized by a different computing device;
based on comparing the first feature extractor of the computing device with the second feature extractor utilized by the different computing device, determine that the second feature extractor of the different computing device is different from the first feature extractor;
based on (1) determining the second estimated confidence level corresponds to the valid result, (2) identifying the at least one statistically improbable characteristic, and (3) determining that the different computing device comprises the second feature extractor different from the first feature extractor, provide the second feature vector to the different computing device for an evaluation of the second feature vector by the second, different feature extractor;

receive from the different computing device weighting information derived from the evaluation of the second feature vector; and use the weighting information to bias a speech recognition engine of the speech recognition program.

16. The computing device of claim 15, wherein the speech recognition data comprises feature vectors that are generated by an acoustic representation generator of the speech recognition program, the speech recognition program configured to provide state information of the acoustic representation generator to the different computing device.

* * * * *